(12) United States Patent
Horn et al.

(10) Patent No.: US 11,272,400 B2
(45) Date of Patent: Mar. 8, 2022

(54) ADVANCED NARROW BAND TRAFFIC CONTROLLER UNITS (TCU) AND THEIR USE IN OMNI-GRID SYSTEMS

(71) Applicants: Dan Horn, Marietta, GA (US); Gregory S. Garson, Marietta, GA (US); John R. Loud, Marietta, GA (US); Timothy Kelly, Fayetteville, NY (US); Jackin Alix Bien Aime, Valhalla, NY (US); Mathe Eliel Kasereka, Nord-Kivu (CG); Lee W. McKnight, Manilus, NY (US)

(72) Inventors: Dan Horn, Marietta, GA (US); Gregory S. Garson, Marietta, GA (US); John R. Loud, Marietta, GA (US); Timothy Kelly, Fayetteville, NY (US); Jackin Alix Bien Aime, Valhalla, NY (US); Mathe Eliel Kasereka, Nord-Kivu (CG); Lee W. McKnight, Manilus, NY (US)

(73) Assignee: imCon International Inc, Marietta, GA (US)

(*) Notice: Subject to any disclaimer, the term of this patent is extended or adjusted under 35 U.S.C. 154(b) by 13 days.

(21) Appl. No.: 16/546,208

(22) Filed: Aug. 20, 2019

(65) Prior Publication Data
US 2020/0059826 A1 Feb. 20, 2020

Related U.S. Application Data

(60) Provisional application No. 62/719,766, filed on Aug. 20, 2018.

(51) Int. Cl.
*H04W 28/12* (2009.01)
*H04W 4/80* (2018.01)
(Continued)

(52) U.S. Cl.
CPC ............. *H04W 28/12* (2013.01); *H04W 4/80* (2018.02); *H04W 16/14* (2013.01); *H04W 24/08* (2013.01); *H04W 28/06* (2013.01); *H04W 84/18* (2013.01)

(58) Field of Classification Search
CPC ....... H04W 28/12; H04W 4/80; H04W 24/08; H04W 16/14; H04W 28/06; H04W 84/18; H04W 88/16; H04W 24/02; Y02A 30/60
See application file for complete search history.

(56) References Cited

U.S. PATENT DOCUMENTS

| 9,497,315 B1* | 11/2016 | Pakidko | H04M 3/2281 |
| 10,512,028 B1* | 12/2019 | Capalbo | H04W 4/80 |
| 2004/0184540 A1* | 9/2004 | Miura | H04N 21/2362 |
| | | | 375/240.12 |

(Continued)

*Primary Examiner* — Tejis Daya
(74) *Attorney, Agent, or Firm* — JWIP & Patent Services, LLC; Jacob G. Weintraub, Esq.

(57) ABSTRACT

The present invention is directed to novel tools and systems for controlling narrow band data (e.g., data communication and telecommunications) pathways through selective engagement with one or more narrow band platforms of an omni-grid system. These methods further comprise enhanced compression methods suitable to structure the data for controlled data flow in an omni-grid system. In particular, the tools and the systems of the present invention provide improved transmission to off-grid environments (e.g., stronger, faster, and stable with less latency, jitter, and/or packet loss under difficult/harsh signal conditions), including in the context of an urban environment where one may be off the grid temporarily due to an emergency, in educational settings, as well as for use in geographically remote locations not in proximity to physical network infrastructure (e.g., for Internet of Things data access).

24 Claims, 6 Drawing Sheets

(51) Int. Cl.
*H04W 24/08* (2009.01)
*H04W 16/14* (2009.01)
*H04W 28/06* (2009.01)
*H04W 84/18* (2009.01)

(56) References Cited

U.S. PATENT DOCUMENTS

| | | | | |
|---|---|---|---|---|
| 2004/0267419 | A1* | 12/2004 | Jeng | B60R 25/102 701/36 |
| 2011/0098030 | A1* | 4/2011 | Luoma | H04W 4/24 455/419 |
| 2011/0183685 | A1* | 7/2011 | Burton | H04L 67/18 455/456.1 |
| 2012/0066140 | A1* | 3/2012 | Hegeman | G06Q 10/10 705/319 |
| 2012/0260296 | A1* | 10/2012 | Mallet | H04W 76/15 725/62 |
| 2013/0304726 | A1* | 11/2013 | Sandulescu | G06Q 50/01 707/722 |
| 2014/0094148 | A1* | 4/2014 | Lang | H04L 43/0805 455/411 |
| 2014/0269572 | A1* | 9/2014 | Li | H04L 5/005 370/329 |
| 2014/0269671 | A1* | 9/2014 | Kalkunte | H04W 24/00 370/350 |
| 2014/0326771 | A1* | 11/2014 | Almalki | G01G 19/58 224/576 |
| 2015/0045063 | A1* | 2/2015 | Mishra | H04W 4/029 455/456.2 |
| 2015/0178032 | A1* | 6/2015 | Gantman | H04N 21/43637 345/520 |
| 2015/0215974 | A1* | 7/2015 | Cloutier | H04W 12/082 455/405 |
| 2015/0379510 | A1* | 12/2015 | Smith | G06Q 20/3829 705/71 |
| 2018/0062674 | A1* | 3/2018 | Boghrat | H03F 1/3247 |

* cited by examiner

ADVANCED NARROW BAND TRAFFIC CONTROLLER UNITS (TCU) AND THEIR USE IN OMNI-GRID SYSTEMS

RELATED APPLICATIONS

This application claims priority to U.S. Provisional Patent Application No. 62/719,766 filed on Aug. 20, 2018; the entirety of which is incorporated herein by reference.

BACKGROUND OF THE INVENTION

Communication of data to off-the-grid environments has proven challenging for years, and continues to this day to be difficult in existing systems of communication. In fact, current off-the grid, or "off-grid," designs (which are typically resource-constrained), are often further limited to a specific set of interacting devices or means of communication; each of which has significant limitations. All of which, however, afford limited bandwidth for carrying voice or minimal data over these devices, resulting in poor transmission quality, speed, and stability of signal. This means any demanding data or tele-communication with remote or off-grid locations is less than viable.

Radio services, such as General Mobile Radio Service (GMRS), Family Radio Service (FRS) and Citizens Band (CB) Radio have been used for local communication in off-grid environments, but have a very limited range. Further, they are limited in many ways by different terrain as well as by the surrounding structures; for example, there are increased limitations in mountainous regions. In contrast, most all forms of communications today utilize some amount of on-grid support typically implemented using narrowband telecommunication and data communication technologies to carry voice and data on a limited number of frequency sets, e.g., that spans from 50 cps to 64 kbit/s.

As such, in the context of an urban environment where one may be off the grid temporarily due to an emergency, in educational settings, as well as for use in geographically remote locations not in proximity to physical network infrastructure (e.g., for Internet of Things data access), there is significant need for more robust tools and systems of communication that are capable of higher quality off-grid use. In particular, there is a need for new tools and systems that work both off-grid as well as on-grid to support a fluid array of communication options

SUMMARY OF THE INVENTION

Accordingly, the present invention is directed to novel tools and systems for controlling narrow band data (e.g., data communication and telecommunications) pathways through selective engagement with one or more narrow band platforms of an omni-grid system. These methods further comprise enhanced compression methods suitable to structure the data for controlled data flow in an omni-grid system. In particular, the tools and the systems of the present invention provide improved transmission to off-grid environments (e.g., stronger, faster, and stable with less latency, jitter, and/or packet loss under difficult/harsh signal conditions), including in the context of an urban environment where one may be off the grid temporarily due to an emergency, in educational settings, as well as for use in geographically remote locations not in proximity to physical network infrastructure (e.g., for Internet of Things data access).

As such, one aspect of the invention provides an advanced narrow band traffic controller unit (TCU) for controlling narrow band data (e.g., data communication and telecommunications) pathways through selective engagement with one or more narrow band platforms of an omni-grid system, and engineered with enhanced compression methods suitable to structure the data for controlled data flow in an omni-grid system. In certain aspects of the invention, the advanced narrow band traffic controller unit comprises a machine-readable medium having instructions stored thereon for execution by a processor to perform a method comprising the steps of: receiving narrow band data into a data structuring queue on a second machine-readable medium; monitoring the data structuring queue to identify narrow band frequency; enhancing the narrow band data flow rate using data structuring compression selected based on the identified narrow band frequency for controlled data flow; and transmitting the structured data to the appropriate narrow band broadcast transmitter for broadcast transmission (e.g., capable of receipt by a receiver configured to receive structured data derived from the advanced narrow band TCU), such that the controlled data rate affords improved transmission (e.g., stronger, faster, and stable with less latency, jitter, and/or packet loss under difficult/harsh signal conditions).

Another aspect of the invention provides an omni-grid system (OGS) designed for narrow band communication engineered to operate off-grid and on-grid comprising: an advanced narrow band traffic controller unit (TCU) of the present invention; a narrow band broadcast transmitter operationally associated with the advanced narrow band traffic controller unit; a narrow band receiver operationally associated with the advanced narrow band traffic controller unit; and an interfacing unit suitable for monitoring, storing and manipulating narrow band data.

BRIEF DESCRIPTION OF THE FIGURES

Advantages of the present apparatus will be apparent from the following detailed description, which description should be considered in combination with the accompanying figures, which are not intended limit the scope of the invention in any way.

DETAILED DESCRIPTION OF THE INVENTION

The systems and tools of the present invention facilitate communication between individuals around the planet in stressed environments or remote locations, provide immediate connections to communication networks for any environment on or off the grid, offer multiple options to share and receive information, and are capable of adaption to connect devices (including Internet of Things devices) for countless uses that require connections in distant locales.

Accordingly, the present invention is directed to novel tools and systems for controlling narrow band data (e.g., data communication and telecommunications) pathways through selective engagement with one or more narrow band platforms of an omni-grid system. These methods further comprise enhanced compression methods suitable to structure the data for controlled data flow in an omni-grid system. In particular, the tools and the systems of the present invention provide improved transmission to off-grid environments (e.g., stronger, faster, and stable with less latency, jitter, and/or packet loss under difficult/harsh signal conditions), including in the context of an urban environment where one may be off the grid temporarily due to an emergency, in educational settings, as well as for use in geographically remote locations not in proximity to physical network infrastructure (e.g., for Internet of Things data access).

The tools and systems of the present invention work both off-grid as well as on-grid to support a fluid array of communication options. Moreover, the omni-grid systems of the present invention are capable of establishing trusted device and user communities off-grid, for example, integrating Wi-Fi mesh, GoTennas mesh, cellular mesh, UHF/VHF mesh and LoRaWan mesh networks. If Internet Service is unavailable, the user/device community of an omni-grid system of the present invention utilizes a satellite Internet hotspot for chat and other low-bandwidth applications. In this respect, users benefit from having access to diverse capabilities which may be extended or further self-adapted for their particular needs, in dynamically changing off-the-grid contexts. With on-grid utility of the omni-grid systems of the present invention, users also benefit from occasional and limited access to a very low-bandwidth satellite Internet connection, or Wi-Fi, or 4G LTE access to dynamically relocatable hotspots.

The omni-grid systems of the present invention provide for the integration of numerous narrowband broadcast platforms, including the ability of remote locations to robustly interface with Internet of Things via narrowband. Moreover, in certain embodiments, the systems provide graceful degradation across a multitude of networks, multiple devices, and cloud services with secure edge access, which is not readily available from any other off-the-grid solution.

The present invention, including systems, tools, and related methods will be described with reference to the following definitions that, for convenience, are set forth below. Unless otherwise specified, the below terms used herein are defined as follows:

I. Definitions

As used herein, the term "a," "an," "the" and similar terms used in the context of the present invention (especially in the context of the claims) are to be construed to cover both the singular and plural unless otherwise indicated herein or clearly contradicted by the context.

The term "blockchain" is art-recognized, and is used to describe a continuously growing list of records, called blocks, which are linked and secured using cryptography. Each block typically contains a cryptographic hash of the previous block, a timestamp, and transaction data, and as such, by design, a blockchain is resistant to modification of the data. Blockchain is often used as an open, distributed ledger that can record transactions between two parties efficiently and in a verifiable and permanent way.

The term "interface" is art-recognized, and is used herein to describe a shared boundary across which two separate components of a computer system exchange information, which can be between software, computer hardware, peripheral devices, humans and combinations of these. In specific embodiments, the term "interface" may be a user interface, e.g., a graphic user interface. Moreover, the operation of two separate components across the boundary, as in the interaction of the user with a user interface, is referred to herein as "interfacing." In certain embodiments, the interfacing may be bi-directional. In other embodiments, the interfacing may be uni-directional.

The term "LoRaWAN" is art-recognized, and used to describe a media access control (MAC) protocol for wide area networks designed to allow low-powered devices to communicate with Internet-connected applications over long range wireless connections. The LoRaWAN protocols are defined by the LoRa Alliance which are formalized in the LoRaWAN.

The language "machine-readable medium" is art-recognized, and describes a medium capable of storing data in a format readable by a mechanical device (rather than by a human). Examples of machine-readable media include magnetic media such as magnetic disks, cards, tapes, and drums, punched cards and paper tapes, optical disks, barcodes, magnetic ink characters, and solid state devices such as flash-based, SSD, etc. Machine-readable medium of the present invention are non-transitory, and therefore do not include signals per se, i.e., are directed only to hardware storage medium. Common machine-readable technologies include magnetic recording, processing waveforms, and barcodes. In particular embodiments, the machine-readable device is a solid state device. Optical character recognition (OCR) can be used to enable machines to read information available to humans. Any information retrievable by any form of energy can be machine-readable. Moreover, any data stored on a machine-readable medium may be transferred by streaming over a network. In a particular embodiment, the machine-readable medium is a network server disk, e.g., an internet server disk, e.g., a disk array. In specific embodiments, the machine-readable medium is more than one network server disk.

The term "mesh" is art-recognized, and used to describe an interconnection among devices or nodes, which often consist of mesh clients, mesh routers and gateways. The mesh clients are frequently laptops, cell phones and other wireless devices; while the mesh routers forward traffic to and from the gateways which may be connected to the internet (but are not necessarily connected to the internet). In a wireless mesh network, as a low-mobility centralized form of wireless ad hoc network, topology tends to be static, so that routes computation can converge and delivery of data to their destinations can occur. The coverage area of the radio nodes working as a single network is often called a "mesh cloud," and access to this mesh cloud is dependent on the radio nodes working in harmony with each other to create a radio network. Using redundancy principles, if one node can no longer operate, the rest of the nodes can still communicate with each other, directly or through one or more intermediate nodes.

The term "narrow band" is art-recognized, and is used herein to describe data communication and telecommunication frequency platforms, as well as related tools, technologies and services that utilize a narrower set or band of frequencies in the communication channel. Narrow band channel frequency is considered flat, or which will use a lesser number of frequency sets. Exemplary narrow band platforms include, but are not limited to, cloud or internet, a mesh network (e.g., LoRaWan Wireless Mesh, GoTenna Mesh), satellite (e.g., Satcon & GPS), Wi-Fi, Bluetooth, cellular mobile (e.g., 2G, 3G, 4G, LTE networks, e.g., a smartphone; 5G, e.g., Firstnet), dynamic spectrum sharing radio services (such as CBRS and White Spaces, as well as higher frequency services used in backhaul; femto, pico, microcellular and distributed antenna systems typically integrated with cloud and Internet), and any combination thereof.

The language "omni-grid system" are used herein to describe communication systems that are capable of operating on both on-grid and off-grid environments.

The term "operationally associated" is used herein to describe items that are associated, connected, or related in such a manner as to achieve a common intended purpose of operation of the items together. For example, a narrow band broadcast transmitter may be operationally associated with an advanced narrow band traffic controller unit in such a way as to afford the ability of the advanced narrow band traffic controller unit to transmit the structured data generated by the advance narrow band traffic controller unit.

The term "storing" is art-recognized, and is used herein to describe the act of saving data on a machine readable medium in a manner that such data is subsequently retrievable on that machine readable medium.

The term "user" or "operator" are used interchangeably herein to describe any person that operates the systems of the present invention, e.g., interfaces with the user interface of the present invention. In certain embodiments, user is a "transmitting user," which is defined with respect to a communication, and is used to describe the sender of that communication (i.e., to the receiving user). In certain embodiments, user is a "receiving user," which is defined with respect to a communication, and is used to describe the receiver of that communication (i.e., from the transmitting user).

The language "wireless mesh" or "wireless mesh network" are used interchangeably herein, and are art-recognized to describe a communications network made up of radio nodes organized in a mesh topology. It is also one form of a wireless ad hoc network.

II. Methods Of Controlling Narrow Band Data Pathways

One embodiment of the present invention provides a method of controlling narrow band data (e.g., data communication and telecommunications) pathways through selective engagement with one or more narrow band platforms of an omni-grid system. These methods further comprise enhanced compression methods suitable to structure the data for controlled data flow in an omni-grid system.

In certain embodiments of the methods of the present invention, the method comprises the steps of:

receiving narrow band data into a data structuring queue on a second machine-readable medium;

monitoring the data structuring queue to identify narrow band frequency;

enhancing the narrow band data flow rate using data structuring compression selected based on the identified narrow band frequency for controlled data flow; and transmitting the structured data to the appropriate narrow band broadcast transmitter for broadcast transmission (e.g., capable of receipt by a receiver configured to receive structured data derived from the advanced narrow band TCU), such that the controlled data rate affords improved transmission (e.g., stronger, faster, and stable with less latency, jitter, and/or packet loss under difficult/harsh signal conditions).

In certain embodiments of the present invention, the method further comprises the step of receiving structured data, e.g., from an advanced narrow band controller unit of the present invention or other radio or cloud service.

In certain embodiments of the methods of the present invention, the narrow band platform is selected from the group consisting of cloud or internet, a mesh network (e.g., LoRaWan Wireless Mesh, GoTenna Mesh), satellite (e.g., Satcon & GPS), Wi-Fi, Bluetooth, cellular mobile (e.g., 2G, 3G, 4G, LTE networks, e.g., a smartphone; 5G, e.g., Firstnet), dynamic spectrum sharing radio services (such as CBRS and White Spaces, as well as higher frequency services used in backhaul; femto, pico, microcellular and distributed antenna systems typically integrated with cloud and Internet), and any combination thereof.

A. Receiving Narrow Band Data into a Data Structuring Queue

The methods of the present invention comprise the step of receiving narrow band data into a data structuring queue on a second machine-readable medium. In certain embodiments, the narrow band data is received by a receiver. In certain embodiments, the narrow band data is generated or collected (e.g., by device input or user input).

Once received, the narrow band data is stored (e.g., short term or long term, e.g., cached) and queued for structuring of the data. In certain embodiments, the generation of the structuring queue initiates/triggers the step of identifying narrow band frequency based on queue monitoring. In particular embodiments, the generation of the structuring queue initiates/triggers the step of caching certain data for retrieval in later communication, ultimately adding to the efficient reduction in bandwidth requirements.

In certain embodiments of the methods of the present invention, the narrow band data is a text communication or picture communication (e.g., video display or image display).

In certain embodiments of the methods of the present invention, the narrow band data is streaming textual communication.

In certain embodiments of the methods of the present invention, the narrow band data is a video. In certain embodiments, the narrow band data is a live stream video.

B. Monitoring the Data Structuring Queue

The methods of the present invention further comprise the step of monitoring the data structuring queue to identify narrow band frequency. As narrow band data is received into the structuring queue, the narrow band frequency is identified. In certain embodiments, the data in the identified narrow band frequency is then organized based on narrow band platform.

In certain embodiments, multiple narrow band frequency strengths may be monitored through network optimization to allow determination/calculation/detection and active selection of the fastest (narrow band dependent) data flow, e.g., taking into consideration the type of communication received. Limits on strength of narrow band frequencies may be set automatically or manually.

C. Enhancing the Narrow Band Data Flow Rate Using Data Structuring Compression

The methods of the present invention further comprise the step of enhancing the narrow band data flow rate using data structuring compression selected based on the identified narrow band frequency for controlled data flow. In this step, the identified narrow band frequency flow is efficiently compressed, e.g., frequency dependently, in a manner suitable to aggregate and consolidate the narrow band data in the flow to be more controllable. This aggregated and consolidated narrow band data is described herein as, structured, or considered structured data. The advantage of utilizing structured data is based on the understanding that slower controlled and monitored data flow results in more useful data, enhancing the narrow band flow rate, e.g., to result in flow that is stronger, faster, and more stable with less latency, jitter, and/or packet loss under difficult/harsh signal conditions.

In contrast, unstructured data flow, i.e., data without application of the structuring compression described herein, reduces the value of the data of the flow itself and produces data flows that result in a lessening or decrease in the consistency of the user experience and are weaker, slower, and less stable, particularly under difficult/harsh signal conditions. In particular embodiments, the enhancement results in flow that is significantly better and more consistent user experience, as compared with unstructured data flow.

In certain embodiments, the data structuring compression is lossy compression.

In certain embodiments, the data structuring compression is lossless compression.

In certain embodiments, the data structuring compression is used to reduce data rates and costs.

In certain embodiments, the data structuring compression may be done at the mobile application (micro layer), local backpack or area server (Mini layer), and/or in "the cloud" (Cloud layer) to offload the computational aspects of these optimization techniques.

i. Exemplary Data Structuring Compression

Data structuring compression in the omni-grid systems of the present invention, which incorporate an advanced narrow band traffic controller unit of the present invention (see, for example, FIG. 5) account for the identified narrow band frequency of the data communication in selection for frequency dependent efficient compression in a manner suitable to aggregate and consolidate the narrow band data in the flow to be more controllable.

For example, an application running on a mobile device (micro layer) interfacing unit makes an inquiry for content through the standard Wi-Fi connection to be viewed or interacted with on the mobile device. This inquiry is initially "parsed" by the mobile application browser as to its origin, content makeup, and connection that is being used to connect to that content in the optimal manner keeping in mind bandwidth and connection considerations.

If the connection is only a localized connection i.e., Wi-Fi, and does not reach out to the internet, then the inquiry is made for the specified content locally from the micro layer mobile device or from the mini layer server within the local Wi-Fi network, using a caching mechanism for local content. In cases where the content is available and has already been cached, using the micro layer caching server on the mobile device and the mini layer caching server on the local mini layer server, then the content is delivered immediately to the mobile device through the Wi-Fi connection alleviating any need to go to the internet or use any significant bandwidth from the system.

Alternatively, in the case that the content is not locally cached, the mobile application in combination with the router in the omni-grid system will determine the 1) connection type (e.g., LTE and related speeds, Wi-Fi, or satellite) and 2) connect to the appropriate cloud layer proxy server, with the proxy server being a utility server that allows integration of and manipulation of the various data stream types to effectively compress the data streams to a more controllable flow, and 3) reach out through this proxy server to retrieve the content to produce structured data.

Once the pathway to content has been determined, the cloud layer based proxy/caching server is used to interrogate the data being requested and, in cases where security and encryption are not in place, that content may be further optimized by sending the content request to additional external service providers to "degrade" the content stream in such a way to make the user experience as optimal as possible. In particular embodiments, the settings of user experience are available in the micro layer mobile app and mini layer omni-grid administration system to allow users and administrators to increase or decrease the level of optimization that is available to be used. It should be understood that high levels of optimization will result in a more robust user experience. Although video might be fuzzy, images might be out of focus and various other interactions will be abstracted to allow a usable interaction when the bandwidth and/or latency is less than optimal: the display and interactions will be much more robust and of a higher experience standard. In further embodiments, these techniques and process can be extended to removing all extraneous media content and return only a text interpretation of the content in situation where the bandwidth is very low as in a satellite connection.

The structured data with optimized content is then returned to the user through the mini layer of the omni-grid system, router and then back to the micro layer mobile application to allow the user to experience the requested content, e.g., in such a way that they enjoy a familiar and consistent user experience regardless of a low or "narrow" bandwidth connection.

In certain embodiments, during this entire process of data structuring compression and content optimization, there may be a network optimization process running the background (e.g., at all times) that manages and monitors the backhaul connection to the internet and allows for packet re-sequencing and data structuring of the network packets to allow the network layer to be as efficient as possible. Such processes may be accomplished with software on the local mini server connecting to a cloud based hardware network optimization system and allow for yet another leave of efficiency. In specific embodiments, for example, using network optimization systems and architectures combined, and allowing for specific user configurable measures, the pathways are capable of producing optimized data throughput based upon latency, content, and connection types.

D. Transmitting the Structured Data

The methods of the present invention further comprise the step of transmitting the structured data to the appropriate narrow band broadcast transmitter for broadcast transmission (e.g., capable of receipt by a receiver configured to receive structured data derived from the advanced narrow band TCU). In certain embodiments, the structured data is transmitted by a narrow band broadcast transmitter.

In certain embodiments, the structured data is transmitted over directly connected ethernet, Wi-Fi, micro-cell, cellular and various other standardized network communication protocols and service models.

In certain embodiments, the structured data is received over directly connected ethernet, Wi-Fi, micro-cell, cellular and various other standardized network communication protocols and service models.

III. Advanced Narrow Band Traffic Controller Unit (TCU) of the Present Invention The methods of the present invention are useful as instructions stored on a machine-readable medium for execution by a processor to perform the method. In certain embodiments, the methods and controller units of the present invention also make use and/or comprise a processor. Accordingly, any methods of the present invention, alone or in combination with other methods (such as those described herein or elsewhere) may be stored on a machine-readable medium for execution by a processor to perform the method. Such a composition comprises advanced narrow band traffic controller unit (TCU) for controlling narrow band data pathways through selective engagement with one or more narrow band platforms of an omni-grid system, and engineered with enhanced compression methods suitable to structure the data for controlled data flow in an omni-grid system.

In this respect, another embodiment of the present invention provides an advanced narrow band traffic controller unit (TCU) for controlling narrow band data (e.g., data communication and telecommunications) pathways through selective engagement with one or more narrow band platforms of an omni-grid system, and engineered with enhanced compression methods suitable to structure the data for controlled data flow in an omni-grid system.

In certain embodiments of the present invention, the advanced narrow band traffic controller unit comprises a machine-readable medium having instructions stored thereon for execution by a processor to perform a method, as described herein, for example, comprising the steps of:

receiving narrow band data into a data structuring queue on a second machine-readable medium;

monitoring the data structuring queue to identify narrow band frequency;

enhancing the narrow band data flow rate using data structuring compression selected based on the identified narrow band frequency for controlled data flow; and transmitting the structured data to the appropriate narrow band broadcast transmitter for broadcast transmission (e.g., capable of receipt by a receiver configured to receive structured data derived from the advanced narrow band TCU), such that the controlled data rate affords improved transmission (e.g., stronger, faster, and stable with less latency, jitter, and/or packet loss under difficult/harsh signal conditions).

In certain embodiments of the advanced narrow band traffic controller unit (TCU) of the present invention, the narrow band data received is captured by a narrow band receiver operationally associated with the advanced narrow band traffic controller unit (e.g., from a data communication device or a telecommunication device). In certain embodiments, the narrow band receiver is a narrow band receiver for a narrow band platform selected from the group consisting of cloud or internet, a mesh network (e.g., LoRaWan Wireless Mesh, GoTenna Mesh), satellite (e.g., Satcon & GPS), Wi-Fi, Bluetooth, cellular mobile (e.g., 2G, 3G, 4G, LTE networks, e.g., a smartphone; 5G, e.g., Firstnet), dynamic spectrum sharing radio services (such as CBRS and White Spaces, as well as higher frequency services used in backhaul; femto, pico, microcellular and distributed antenna systems typically integrated with cloud and Internet), and any combination thereof.

In certain embodiments of the advanced narrow band traffic controller unit (TCU) of the present invention, the structured data is transmitted through a narrow band broadcast transmitter for a narrow band platform selected from the group consisting of cloud or internet, a mesh network (e.g., LoRaWan Wireless Mesh, GoTenna Mesh), satellite (e.g., Satcon & GPS), Wi-Fi, Bluetooth, cellular mobile (e.g., 2G, 3G, 4G, LTE networks, e.g., a smartphone; 5G, e.g., Firstnet), dynamic spectrum sharing radio services (such as CBRS and White Spaces, as well as higher frequency services used in backhaul; femto, pico, microcellular and distributed antenna systems typically integrated with cloud and Internet), and any combination thereof.

In certain embodiments of the advanced narrow band traffic controller unit (TCU) of the present invention, the method further comprises the step of receiving structured data, e.g., from a second advanced narrow band controller unit or other radio or cloud service. In certain embodiments, the structured data is received through a narrow band receiver for a narrow band platform selected from the group consisting of cloud or internet, a mesh network (e.g., LoRaWan Wireless Mesh, GoTenna Mesh), satellite (e.g., Satcon & GPS), Wi-Fi, Bluetooth, cellular mobile (e.g., 2G, 3G, 4G, LTE networks, e.g., a smartphone; 5G, e.g., Firstnet), dynamic spectrum sharing radio services (such as CBRS and White Spaces, as well as higher frequency services used in backhaul; femto, pico, microcellular and distributed antenna systems typically integrated with cloud and Internet), and any combination thereof.

In certain embodiments of the advanced narrow band traffic controller unit (TCU) of the present invention, each of the machine-readable media is selected from the group consisting of magnetic media, punched cards, paper tapes, optical disks, barcodes, magnetic ink characters, and solid state devices, e.g., one or more network server disks. In particular embodiments, the machine-readable medium is one or more network server disks.

In certain embodiments of the advanced narrow band traffic controller unit (TCU) of the present invention, the machine-readable medium is one or more solid state devices, e.g., including software defined radio and sensor networks, e.g., managed from the edge and/or multi-cloud as omni-grid cognitive radios.

In certain embodiments of the present invention, the first machine-readable medium and the second machine-readable medium are the same machine-readable medium.

IV. Systems of the Present Invention

In certain embodiments of the invention, the advanced narrow band traffic controller unit (TCU) of the present invention is combined with component devices to form a communication system, e.g., an omni-grid system (OGS). For example, in particular embodiments, the advanced narrow band traffic controller unit (TCU) of the present invention is combined with one or more of the following: a narrow band broadcast transmitter operationally associated with the advanced narrow band traffic controller unit, a narrow band receiver operationally associated with the advanced narrow band traffic controller unit; and/or an interfacing unit suitable for monitoring, storing and manipulating narrow band data. Such systems may be designed to facilitate communication between individuals around the planet in remote locations. Such systems offer another important advantage related to social impact; given their flexibility, extensibility, and scalability, communication systems of the present invention permit the establishment of independent communities that may define their own rules and permissions, and services.

As such, one embodiment of the present invention is an omni-grid system (OGS) designed for narrow band communication engineered to operate off-grid and on-grid comprising:

an advanced narrow band traffic controller unit (TCU) of the present invention;
a narrow band broadcast transmitter operationally associated with the advanced narrow band traffic controller unit;
a narrow band receiver operationally associated with the advanced narrow band traffic controller unit; and
an interfacing unit suitable for monitoring, storing and manipulating narrow band data.

In certain embodiments of the omni-grid systems of the present invention, the OGS may operate on multiple narrow band platforms simultaneously, e.g., aggregating, analyzing, and visually displaying organizations real-time emergency response data from sensor networks, while simultaneously communicating among disaster relief teams managing emergency events on another narrow band platform. The OGS is an immediate connectivity solution which can enable scientists, students, and emergency response professionals and other users, for example, to safely monitor in real time certain natural events (e.g., volcano and seismological disturbances), allow real time communications and information exchanges between all emergency services organizations (e.g., improving disaster response times) as well as keep the public better informed during such potentially chaotic emergency situations, and offer beneficial uses for both science and/or education.

In certain embodiments of the omni-grid systems of the present invention, the OGS serves as a dynamically relocatable hotspot.

In certain embodiments of the omni-grid systems of the present invention, the OGS serves as an internet service provider.

In certain embodiments of the omni-grid systems of the present invention, the OGS further comprises a battery power source, e.g., a solar panel and rechargeable battery cells. In certain embodiments, the omni-grid systems of the present invention also comprises a power adapter.

In certain embodiments of the omni-grid systems of the present invention, the narrow band data is structured data.

In certain embodiments of the omni-grid systems of the present invention, the narrow band data is unstructured data In certain embodiments of the omni-grid systems of the present invention, the omni-grid system is engineered into a backpack orientation, e.g., foldable, lightweight and/or waterproof. Such orientation affords easy transport. In certain embodiments, the backpack's total weight is under 10 kilograms.

In certain embodiments of the present invention, to propagate the signal and to enhance its utility across users, services and devices, multiple omni-grid systems of the present invention may be spread out for improved performance.

In certain embodiments of the omni-grid systems of the present invention, the omni-grid system is designed with highly redundant and secure software-controlled communications.

In certain embodiments of the omni-grid systems of the present invention, the OGS further comprises software to maintain and extend user and device identity to dynamic off-grid use contexts, and which are capable of residing beyond the cloud, across edge network devices, wired and wireless, for Internet of Things applications. In particular, this software allows all facets of a user's environment to be shared easily. In specific embodiments, this software platform within the OGS allows for easy integration of new mobile and web-based GPS apps for a more fully informed field worker to make on-the-spot life-saving decisions, due to accurate real-time information.

In certain embodiments of the omni-grid systems of the present invention, the OGS is provided with an open design, and cyberphysical architecture, suitable for connecting trusted users (notably not achievable by existing methods or systems). In specific embodiments, Non-Person Entities (software, devices, content, data, information, services, standards and specifications) are permitted Role Based Access Control to other human and Non-Person Entities depending upon their previously defined privileges and permissions.

In certain embodiments, the omni-grid systems of the present invention afford immediate connectivity 'off-grid' creating a cyberphysical, multiple frequency device, cloud and edge service, and user communities. The omni-grid systems of the present invention enable numerous networks to create a hybrid heterogeneous network off-grid, with or without access to a cognitive cloud. In specific embodiments, the OGS enables graceful degradation while sharing resources including network interfaces and use of battery power across any number of identified devices.

In certain embodiments, the omni-grid systems of the present invention afford the ability to create and use multiple micro-cells (or pico-cells), a cellular device that creates a cellular "bubble" of approx. 5-15 km, to link to other micro-cells; thereby allowing a consistent connection "mesh" between each micro-cell. These microcells are suitable to connect with the backpack router in such a way that the backpacks own generated Wi-Fi network will be "meshed" with the other micro-cell connected backpack(s) to allow users across the entire mesh construct to communicate through a data network as well as VOIP voice network. The use of a "backhaul" internet connection to allow the micro-cell mesh to connect to the global internet can be facilitated by numerous methods including direct "hard-wired" ethernet connection, high speed Wi-Fi, and/or satellite to allow the "mesh" access to content and services from the global internet.

A. Components of OGS System

Although the omni-grid systems of the present invention may be designed for use for purposes such as education, trading, internet of things, rescue, security, energy, health, and agriculture, the core omni-grid systems of the present invention comprise a number of components, including: an advanced narrow band traffic controller unit (TCU) of the present invention; a narrow band broadcast transmitter operationally associated with the advanced narrow band traffic controller unit; a narrow band receiver operationally associated with the advanced narrow band traffic controller unit; and an interfacing unit suitable for monitoring, storing and manipulating narrow band data.

i. Advanced Narrow Band Traffic Controller Unit (TCU) of the Present Invention;

The omni-grid systems of the present invention comprise an advanced narrow band traffic controller unit (TCU) of the present invention, i.e., as described herein.

In certain embodiments, the narrow band data is generated or collected (e.g., by device input or user input), e.g., by a device operationally associated with the narrow band traffic controller unit (TCU).

ii. Narrow Band Broadcast Transmitter Operationally Associated with the Advanced Narrow Band Traffic Controller Unit The omni-grid systems of the present invention comprise a narrow band broadcast transmitter operationally associated with the advanced narrow band traffic controller unit.

In certain embodiments of the omni-grid systems of the present invention, the narrow band broadcast transmitter is a narrow band transmitter for a narrow band platform selected from the group consisting of cloud or internet, a mesh network (e.g., LoRaWan Wireless Mesh, GoTenna Mesh), satellite (e.g., Satcon & GPS), Wi-Fi, Bluetooth, cellular mobile (e.g., 2G, 3G, 4G, LTE networks, e.g., a smartphone; 5G, e.g., Firstnet), dynamic spectrum sharing radio services (such as CBRS and White Spaces, as well as higher frequency services used in backhaul; femto, pico, microcellular and distributed antenna systems typically integrated with cloud and Internet), and any combination thereof.

iii. Narrow Band Receiver Operationally Associated with the Advanced Narrow Band Traffic Controller Unit The omni-grid systems of the present invention comprise a narrow band receiver operationally associated with the advanced narrow band traffic controller unit.

In certain embodiments of the omni-grid systems of the present invention, the narrow band receiver is a narrow band receiver for a narrow band platform selected from the group consisting of cloud or internet, a mesh network (e.g., LoRaWan Wireless Mesh, GoTenna Mesh), satellite (e.g., Satcon & GPS), Wi-Fi, Bluetooth, cellular mobile (e.g., 2G, 3G, 4G, LTE networks, e.g., a smartphone; 5G, e.g., Firstnet), dynamic spectrum sharing radio services (such as CBRS and White Spaces, as well as higher frequency services used in backhaul; femto, pico, microcellular and distributed antenna systems typically integrated with cloud and Internet), and any combination thereof.

iv. Interfacing Unit Suitable for Monitoring, Storing and Manipulating Narrow Band Data The omni-grid systems of the present invention comprise an interfacing unit suitable for monitoring, storing and manipulating narrow band data.

In certain embodiments of the omni-grid systems of the present invention, the interfacing unit comprises a user interface, e.g., graphic user interface. In certain embodiments, the user interface is an adaptive interface governed by the narrow band data platform receiving the narrow band data, e.g., suitable for facilitating user access to the narrow band data, e.g., communication between users, e.g., communication between users of two or more narrow band platforms, e.g., facilitating communication between on-grid and off-grid users. Moreover, the interface may be a web application accessible in an Internet browser, desktop software running on Windows, Mac OS, Linux (or any other operating system), or a mobile application (available on smart devices, e.g., smartphones, or tablets). In particular embodiments, the system interface is a cloud based interface, e.g., based on iOS or Android platforms.

In certain embodiments of the omni-grid systems of the present invention, the interfacing unit comprises a third machine-readable medium having instructions stored thereon for execution by a processor to perform a method comprising the steps of: receiving narrow band data and manipulating the narrow band data (e.g., presenting the narrow band for review by a user). In certain embodiments, the method further comprises one or more of the steps of: storing the narrow band data, and transmitting the narrow band data.

In certain embodiments of the omni-grid systems of the present invention, the first machine-readable medium, second machine-readable medium and the third machine-readable medium are the same machine-readable medium. In certain embodiments of the omni-grid systems of the present invention, the second machine-readable medium and the third machine-readable medium are the same machine-readable medium. In certain embodiments of the omni-grid systems of the present invention, the first machine-readable medium and the third machine-readable medium are the same machine-readable medium.

In certain embodiments of the omni-grid systems of the present invention, the user interface is designed to facilitate social network interfacing between users, e.g., using GmPRS.

In certain embodiments of the omni-grid systems of the present invention, the interfacing unit provides security, privacy, trust, resiliency and redundancy including for billing, micropayments and cryptocurrencies, e.g., with respect to the connection between users, e.g., between on-grid and off-grid users.

In certain embodiments of the omni-grid systems of the present invention, the interfacing unit requires authentication for access.

B. Omni-Grid System Backpack Implementations

The omni-grid systems of the present invention may be engineered as a backpack. In certain embodiments, a backpack embodiment, may for example utilize satellite access using the Satcon hotspot adapter and installed related software; cellular network using a cellular service provider; Wi-Fi, LTE, and Ethernet backhaul connection using a router; text Messaging to smartphones using a mobile application; and LoRaWan Wireless Mesh connectivity using Installed software (e.g., also utilizing Bluetooth). In particular embodiments, other applications such as the goTenna's off-the grid mesh text communication and GPS-sharing may also be incorporated into the system.

In certain embodiments, the omni-grid systems of the present invention are a reliable storage system, e.g., using Blockchain technology when dealing with data from IoT and Identity propagation for off-grid usage.

C. Exemplary Systems-Backpacks:

The omni-grid systems of the present invention may be used for a variety of communication purposes, including, but not limited to, education, survival, emergency management, internet of things, social networking, and GPS. Such systems may be engineered in backpack orientations. As such, several exemplary embodiments are listed herein for specific identified use, including: Educational Services; Survival Online Services, Emergency Management, and Internet of Things.

i. Educational Services EDU

In one embodiment, the EDU Backpack comprises the following:
Satellite—iSavi, Bgan, Kymeta, etc.
2×Mobile Phones or Tablets
WiFi—Router
Server for content storage and development
Tactical Backpack
Solar Panel
System Battery ii. Survival Online Services SOS (Core Backpack)

In one embodiment, the SOS Backpack comprises the following:
Satellite—iSavi, Bgan, Kymeta, etc.
2×Mobile Phones or Tablets
WiFi—Router
2 GoTenna Units
Tactical Backpack
Solar Panel
System Battery iii. Emergency Management EMS In one embodiment, the EMS Backpack comprises the following:
Satellite—iSavi, Bgan, Kymeta, etc.
10×Mobile Phones
WiFi—Router
10 GoTenna Units
Tactical Backpack
Solar Panel
System Battery
Server for Command Center communications (Optional)

iv. Internet of Things IoT

In one embodiment, the IoT Backpack comprises the following:
Satellite—iSavi, Bgan, Kymeta, etc.
2×Mobile Phones or Tablets
WiFi—Router
Tactical Backpack
Solar Panel
System Battery
The Things Network Gateway
The Things Network Nodes (Optional)

V. Design Aspects of the Invention

Independent of the utility related to the advanced narrow band traffic controller units and omni-grid systems of the present invention, the ornamental appearance of any novel design provided herein is intended to be part of this invention, for example, each of the views in FIGS. 1 through 6, which may form an independent or combined ornamental appearance of the advanced narrow band traffic controller units and omni-grid systems described herein.

Accordingly, one embodiment of the present invention provide an ornamental design for advanced narrow band traffic controller units and omni-grid systems as shown and described.

EXEMPLIFICATION

Having thus described the invention in general terms, reference will now be made to the accompanying drawings of exemplary embodiments, which are not necessarily drawn to scale, and which are not intended to be limiting in any way.

In this respect, it is to be understood that the invention is not limited in its application to the details of construction and to the arrangements of the components set forth in the description provided herein or illustrated in the Figures. The invention is capable of other embodiments and of being practiced and carried out in various ways. Also, it is to be understood that the phraseology and terminology employed herein are for the purpose of description and should not be regarded as limiting.

Example 1

Representation of One Embodiment of Omni-Grid System

Figure 1:
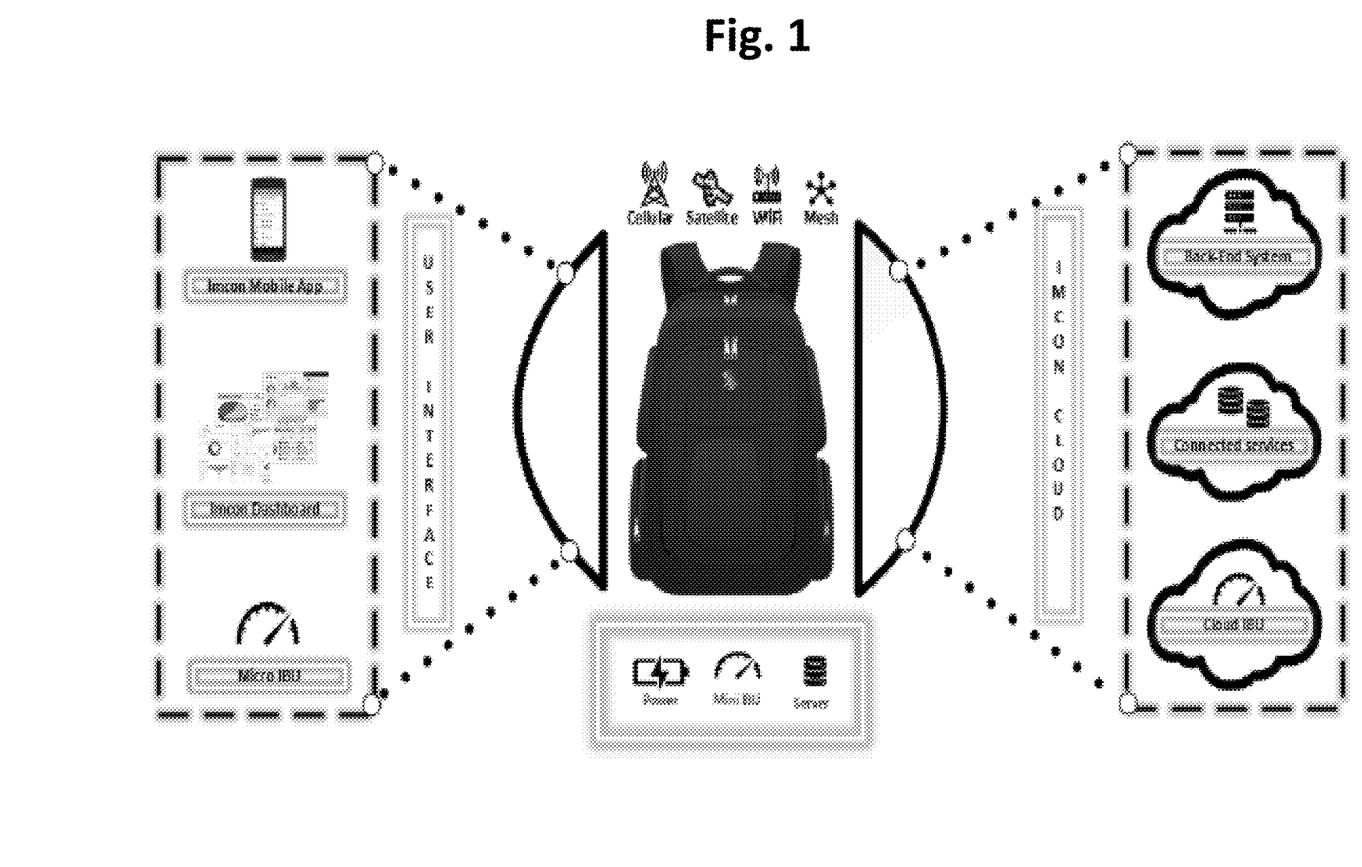
FIG. 1 depicts a schematic representation of certain embodiments of the flow of narrow band data in an omni-grid system of the present invention incorporating three layers (1) Micro (e.g., resident in a user interfacing mobile application), (2) Mini (e.g., resident in the omni-grid system of the present invention), and (3) and cloud (e.g., resident in corresponding cloud platform of the present invention).
Figure 2:
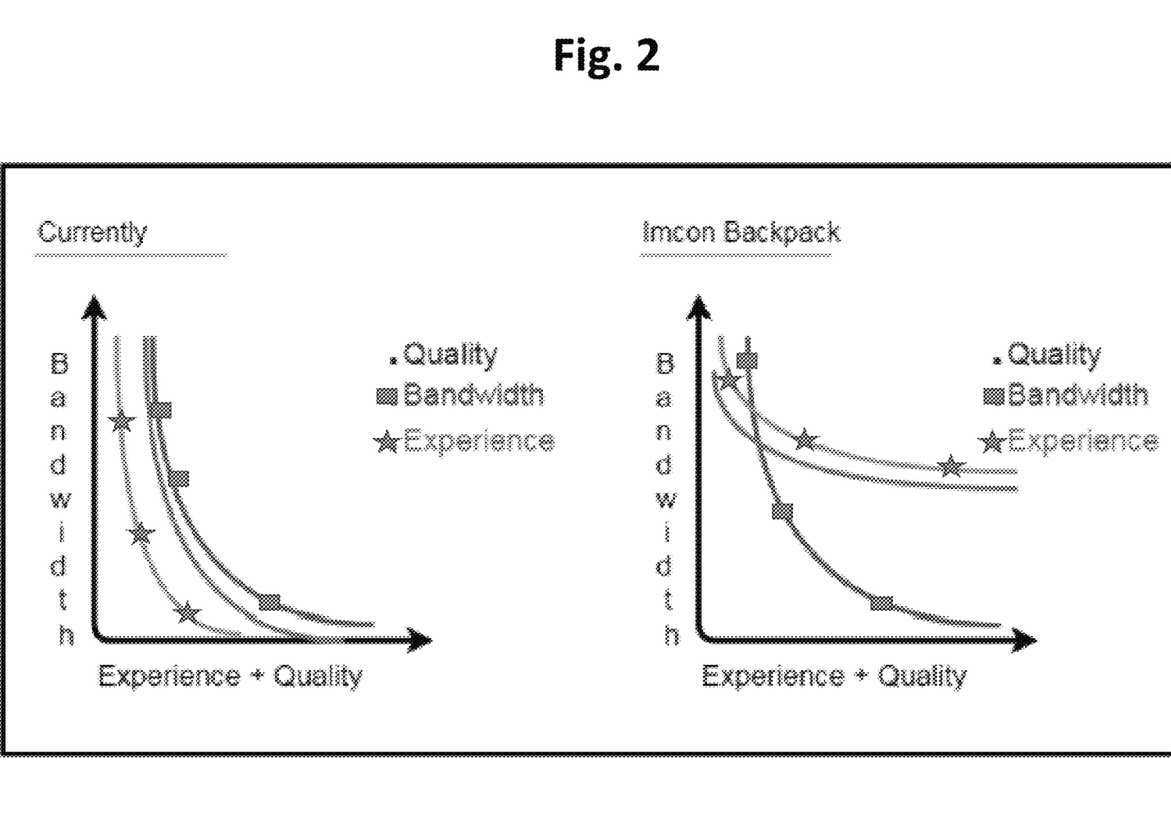
FIG. 2 depicts a graph of the general advancement in experience/quality of the systems of the present invention, denoted as "Imcon Backpack," in comparison to the available bandwidth
Figure 3:
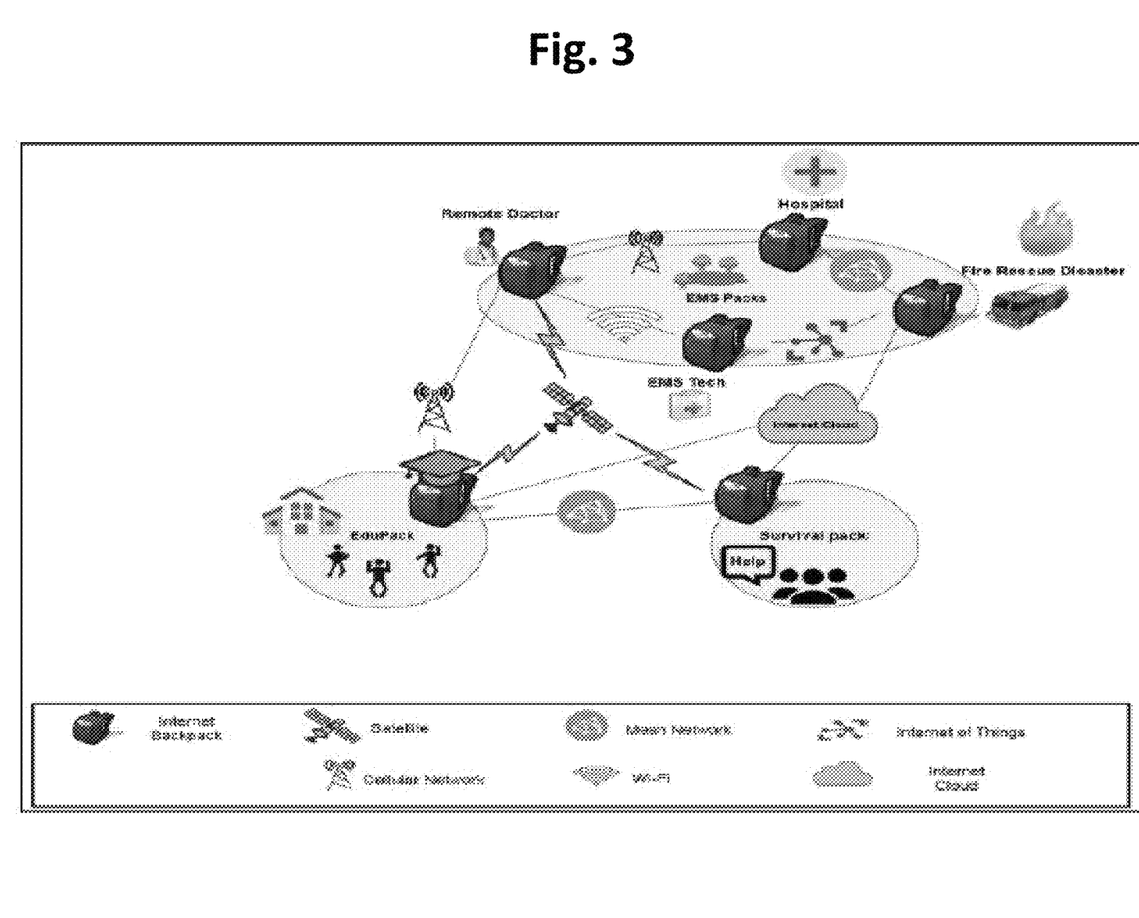
FIG. 3 depicts a graphic representation of exemplary utility of omni-grid systems of the present invention, including specific embodiments.
Figure 4:
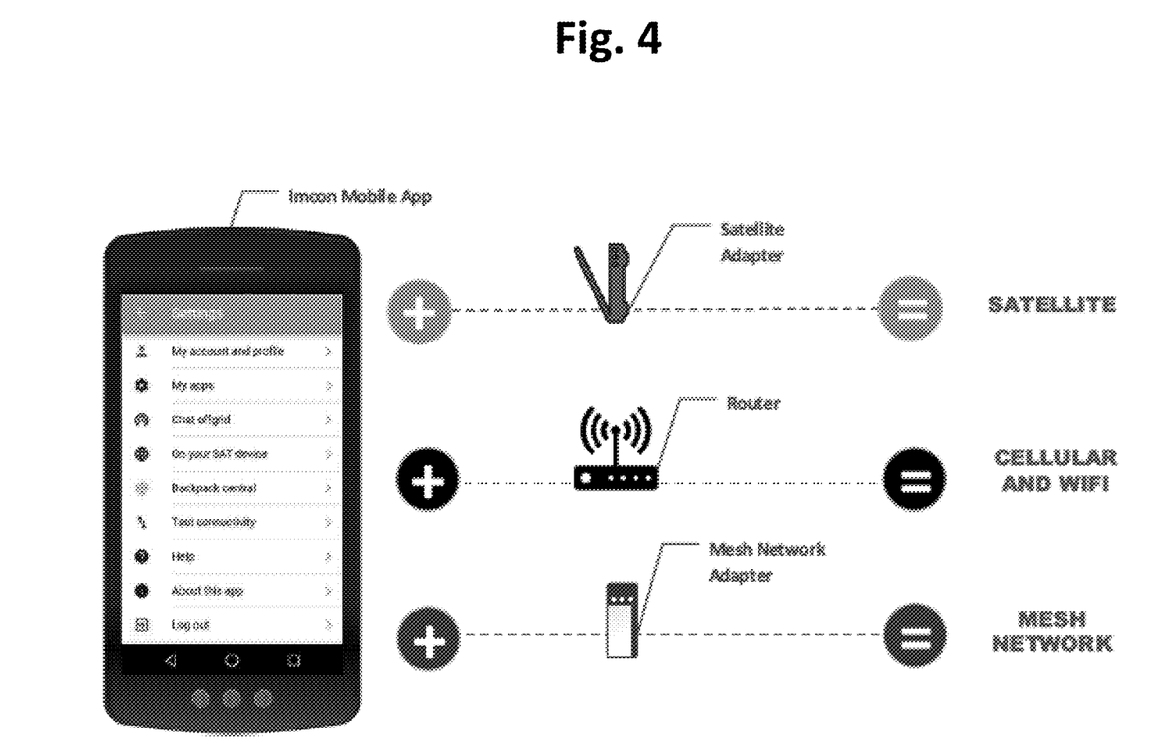
FIG. 4 depicts a schematic representation of a communication connections structure for devices on each end of an advanced narrow band traffic controller unit (TCU) of a particular embodiment of the present invention, providing a multitude of narrowband platforms for omni-grid communication.
Figure 5:
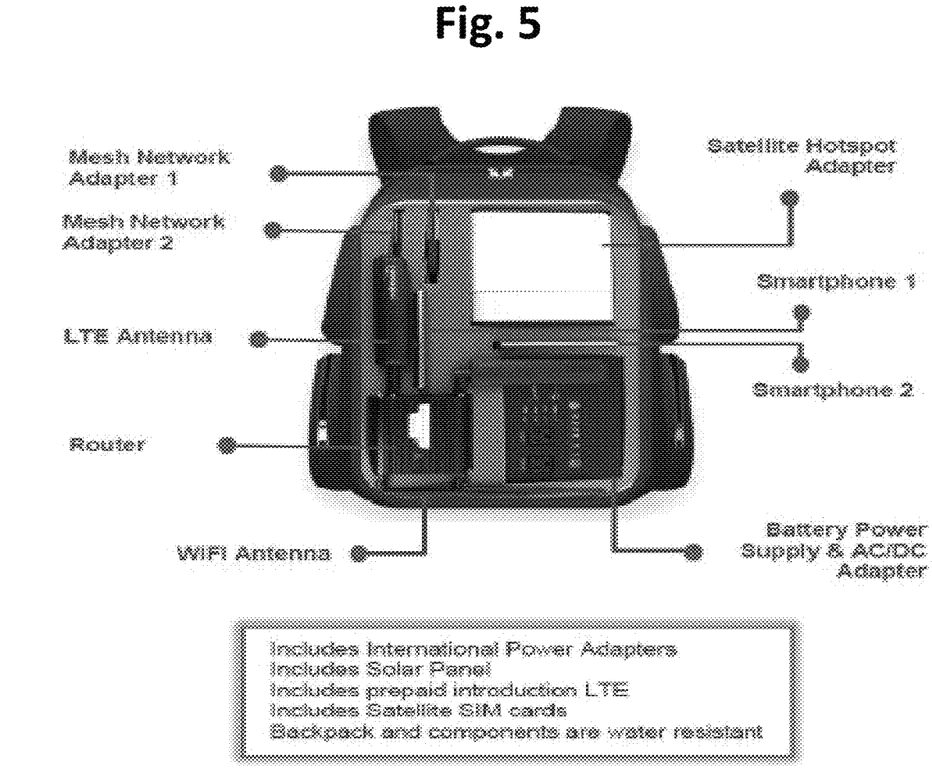
FIG. 5 depicts a one embodiment of the omni-grid systems of the present invention, engineered into a backpack orientation, denoted as an "Imcon Backpack structure."
Figure 6:
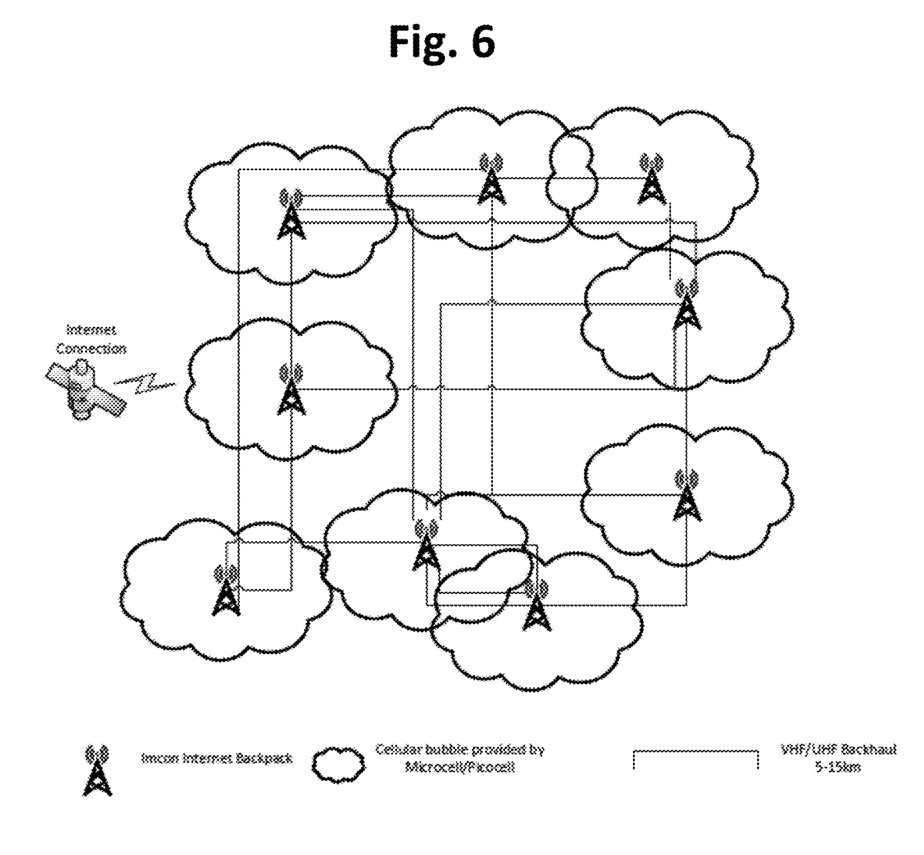
FIG. 6 depicts on particular embodiment of the high level architecture of a micro-cell connected backpack system and the use of a "backhaul" internet connection to allow the micro-cell mesh to connect to the global internet.

FIG. 5 depicts a one embodiment of the omni-grid systems of the present invention, engineered into a backpack orientation, i.e., an "Imcon Internet Backpack structure." This omni-grid system (OGS) designed for narrow band communication engineered to operate off-grid and on-grid comprises: an advanced narrow band traffic controller unit (TCU) of the present invention; a narrow band broadcast transmitter operationally associated with the advanced narrow band traffic controller unit; a narrow band receiver operationally associated with the advanced narrow band traffic controller unit; and an interfacing unit suitable for monitoring, storing and manipulating narrow band data. In particular, the exemplary omni-grid system shown in FIG. 5 comprises a router, two LoRaWAN devices (i.e., mesh network adapters), a satellite hotspot, two smartphones, a water resistant backpack, a battery power supply, a portable solar charger, and LTE antenna, and a power adapter, which are operationally associated with an advanced narrow band traffic controller unit of the present invention.

This example's 'edgeware' platform integrates an open and non-proprietary lightweight edge connectivity solution demonstrated to work over thin satellite data channels when other Internet applications do not; and which enables communication and protects devices, infrastructure, content, users, and other Non-Person Entities. Further this example is portable, and incorporates both a battery to power devices off-grid, and a portable solar panel to recharge the backpack battery and other included devices' batteries, to enable continual use and connectivity, indefinitely.

TABLE 1

Internet Backpack Networks, Frequencies and Services

| Network | Frequency | Type | Functionality | Range | Bandwidth |
| --- | --- | --- | --- | --- | --- |
| Internet goTenna | Any 151-154 MHZ | IP MURS Multi-Use Radio Service Mesh | Connectivity Text Messaging and GPS. Tethers to Smartphone | Unlimited 3-5 kilometers; meshed with other goTennas can | Unlimited 9600 bps |

TABLE 1-continued

Internet Backpack Networks, Frequencies and Services

| Network | Frequency | Type | Functionality | Range | Bandwidth |
|---|---|---|---|---|---|
| | | | extend much further | | |
| 3G | 850/900/2100 MHz | Mobile | Voice, data, text | 8-16 Kilometers | 21 Mbps |
| 4G | 700 MHz, 1700-2100 MHz, 1900 MHz and 2500-2700 MHz) | Mobile LTE | Mobile Connection, Voice, Data Text | 8-16 Kilometers | 100 Mbps |
| The Things Network | 902.3 to 914.9 MHz uplink 923.3 MHz to 927.5 MHz downlink | LoRaWAN Mesh | IoT Information. Separate Device. Wireless Router, Repeater. | 15 Kilometers; meshed with other LoRa devices much further | 0.3-50 kbps |
| iSavi | | Satellite Internet/data/ voice | Tethers smartphone to satellite; works for messaging and voice | | |
| GPS | 1.57542 GHz 1.2276 GHz | Satellite Global location | Location Position | 36,049 Kilometers | |
| Bluetooth | 2.4-2.4835 GHz | ISM (Industrial Scientific Medical) short range radio frequency | Personal Area Network. | 91 Meters | 26 Mbps |
| Bluetooth LE | 2.4-2.4835 GHz | ISM (Industrial Scientific Medical) short range radio frequency Mesh | Lower Energy Variant focuses on interconnectivity of multiple devices. | 100 Meters | 1 Mbit/s |
| Wi-Fi | 2.4 GHz, 5 GHz | ISM Mesh | 802.11ax. Provides network connections for learning materials and course work | 70 meters and much further mesh | 1 Gbit/s |
| Wi-Fi | 2.4 GHz, 5 GHz | ISM Central server | Provides network connections for learning materials and course work | 70 Meters | 25 mbps-1 Gbit/s |

Testing:

Technical performance was evaluated while climbing and at the peak of Mount Nyiragongo, Democratic Republic of the Congo, and 3rd most dangerous volcano in the world.

Testing was $CO_2$ monitoring and emergency response. Tests were conducted on an active volcano to determine how Internet-connectivity and off-grid emergency communications systems could operate in harsh electromagnetic environments. Scientists were able to be in constant satellite communications via the Imcon Cloud-Based omni-grid system with the Imcon Internet Backpack (IIB) Edgeware Platform over a tested distance of 10,944 km. Testing results showed that even when all normal communications systems are unavailable due to an eruption or earthquake event, the omni-grid systems of the present invention were able to maintain communications to other omni-grid systems of the present invention, and users and resources on the Internet anywhere.

Incorporation By Reference

The entire contents of all patents, published patent applications and other references cited herein are hereby expressly incorporated herein in their entireties by reference.

Equivalents

Those skilled in the art will recognize, or be able to ascertain using no more than routine experimentation, numerous equivalents to the specific procedures described herein. Such equivalents were considered to be within the scope of this invention and are covered by the following claims. Moreover, any numerical or alphabetical ranges provided herein are intended to include both the upper and lower value of those ranges. In addition, any listing or grouping is intended, at least in one embodiment, to represent a shorthand or convenient manner of listing independent embodiments; as such, each member of the list should be considered a separate embodiment.

What is claimed is:

1. An advanced narrow band traffic controller unit (TCU) for controlling narrow band data pathways through selective engagement with one or more narrow band platforms of an omni-grid system, and engineered with enhanced compression methods suitable to structure the data for controlled data flow in an omni-grid system, wherein the advanced narrow band traffic controller unit comprises a machine-readable medium having instructions stored thereon for execution by a processor to perform a method comprising the steps of:
receiving narrow band data into a data structuring queue on a second machine-readable medium;
monitoring the data structuring queue to identify narrow band frequency;
enhancing the narrow band data flow rate using data structuring compression selected based on the identified narrow band frequency for controlled data flow; and
transmitting the structured data to the appropriate narrow band broadcast transmitter for broadcast transmission, such that the controlled data rate affords improved transmission.

2. The advanced narrow band traffic controller unit (TCU) of claim 1, wherein the narrow band data received is captured by a narrow band receiver operationally associated with the advanced narrow band traffic controller unit.

3. The advanced narrow band traffic controller unit (TCU) of claim 2, wherein the narrow band receiver is a narrow band receiver for a narrow band platform selected from the group consisting of cloud or internet, a mesh network, satellite, Wi-Fi, Bluetooth, cellular mobile, dynamic spectrum sharing radio services, and any combination thereof.

4. The advanced narrow band traffic controller unit (TCU) of claim 1, wherein the structured data is transmitted through a narrow band broadcast transmitter for a narrow band platform selected from the group consisting of cloud or internet, a mesh network, satellite, Wi-Fi, Bluetooth, cellular mobile, dynamic spectrum sharing radio services, and any combination thereof.

5. The advanced narrow band traffic controller unit (TCU) of claim 1, further comprising the step of receiving structured data.

6. The advanced narrow band traffic controller unit (TCU) of claim 5, wherein the structured data is received through a narrow band receiver for a narrow band platform selected from the group consisting of cloud or internet, a mesh network, satellite, Wi-Fi, Bluetooth, cellular mobile, dynamic spectrum sharing radio services, and any combination thereof.

7. The advanced narrow band traffic controller unit (TCU) of claim 1, wherein each of the machine-readable media is selected from the group consisting of magnetic media, punched cards, paper tapes, optical disks, barcodes, magnetic ink characters, and solid state devices.

8. The advanced narrow band traffic controller unit (TCU) of claim 1, wherein the machine-readable medium is one or more solid state devices.

9. An omni-grid system (OGS) designed for narrow band communication engineered to operate off-grid and on-grid comprising:
an advanced narrow band traffic controller unit (TCU) of claim 1;
a narrow band broadcast transmitter operationally associated with the advanced narrow band traffic controller unit;
a narrow band receiver operationally associated with the advanced narrow band traffic controller unit; and
an interfacing unit suitable for monitoring, storing and manipulating narrow band data.

10. The omni-grid system (OGS) of claim 9, wherein interfacing unit comprises a third machine-readable medium having instructions stored thereon for execution by a processor to perform a method comprising the steps of: receiving narrow band data and manipulating the narrow band data.

11. The omni-grid system (OGS) of claim 10, wherein the method further comprises one or more of the steps of: storing the narrow band data, and transmitting the narrow band data.

12. The omni-grid system (OGS) of claim 9, wherein the interfacing unit comprises a user interface.

13. The omni-grid system (OGS) of claim 12, wherein the user interface is an adaptive interface governed by the narrow band data platform receiving the narrow band data.

14. The omni-grid system (OGS) of claim 12, wherein the user interface is designed to facilitate social network interfacing between users.

15. The omni-grid system (OGS) of claim 9, wherein interfacing unit requires authentication for access.

16. The omni-grid system (OGS) of claim 9, wherein the OGS may operate on multiple narrow band platforms simultaneously.

17. The omni-grid system (OGS) of claim 9, wherein the OGS serves as a dynamically relocatable hotspot.

18. The omni-grid system (OGS) of claim 9, wherein the OGS serves as an internet service provider.

19. The omni-grid system (OGS) of claim 9, wherein the OGS further comprises a battery power source.

20. The omni-grid system (OGS) of claim 9, wherein the data is structured data.

21. The omni-grid system (OGS) of claim 9, wherein the data is unstructured data.

22. The omni-grid system (OGS) of claim 9, wherein the narrow band receiver is a narrow band receiver for a narrow band platform selected from the group consisting of cloud or internet, a mesh network, satellite, Wi-Fi, Bluetooth, cellular mobile, dynamic spectrum sharing radio services, and any combination thereof.

23. The omni-grid system (OGS) of claim 9, wherein the narrow band broadcast transmitter is a narrow band transmitter for a narrow band platform selected from the group consisting of cloud or internet, a mesh network, satellite, Wi-Fi, Bluetooth, cellular mobile, dynamic spectrum sharing radio services, and any combination thereof.

24. The omni-grid system (OGS) of claim 9, wherein the omni-grid system is engineered into a backpack orientation.

* * * * *